Dec. 25, 1951  F. W. BURGESSER  2,579,735
COATED SEED
Filed Sept. 16, 1949
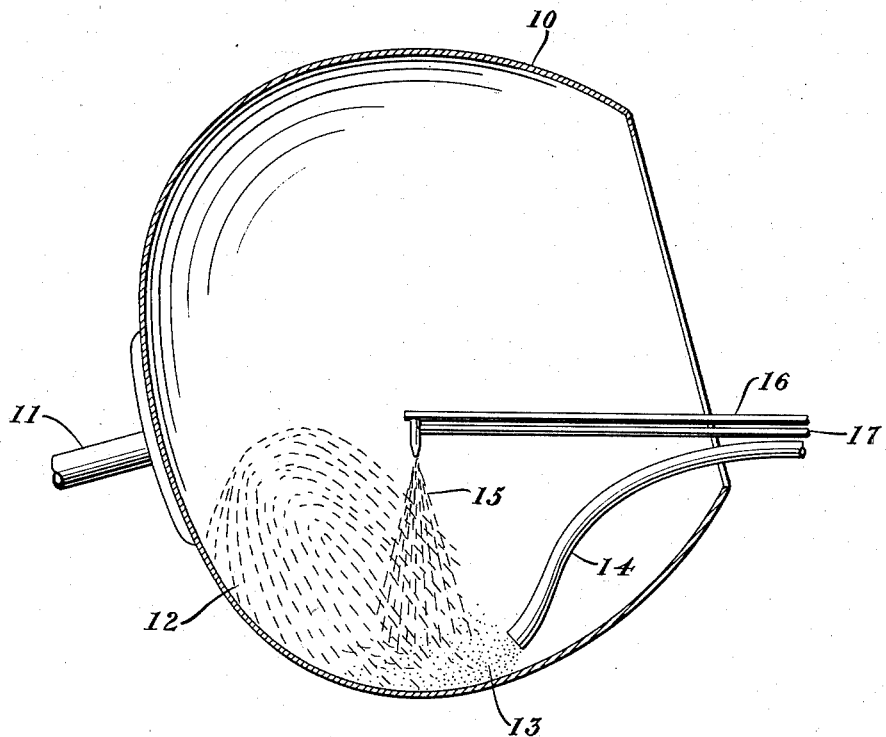
ATTEST
Elwood J. Schaffer
INVENTOR.
Frederick W. Burgesser
BY Norbert E. Burch
Attorney Patented Dec. 25, 1951

2,579,735

UNITED STATES PATENT OFFICE 2,579,735

COATED SEED

Frederick W. Burgesser, Compton, Calif., assignor to Filtrol Corporation, Los Angeles, Calif., a corporation of Delaware Application September 16, 1949, Serial No. 116,124

10 Claims. (Cl. 47—1)

This invention relates to an improved coating for a seed and more particularly to an outer or finish coating for a coated seed comprising a mixture of native sub-bentonite clay and a cellulosic material.

In application Serial No. 698,384, filed September 20, 1946, by Stanard R. Funsten and the applicant, there is described and claimed the process and the product therefrom of forming on seed a protective coating comprising native or raw sub-bentonite clay. In application Serial No. 760,180, filed July 3, 1947, by the applicant there is described and claimed the process and the product therefrom of forming on seed a protective coating comprising native sub-bentonite clay and exfoliated vermiculite. In both of these applications the amount of coating applied to the seed is sufficient to increase the size and weight therefor and to change the shape of the seed so as to enable it to be planted in a mechanical planter. The coating readily forms on the seed without the addition of any bonding material or excessive water and when dried is of sufficient hardness to withstand handling, particularly in a mechanical planter. When such seeds are planted the moisture in the soil is absorbed by the coating material causing the coating to expand and soften. The coating holds the moisture next to the seed and provides the seed with the moisture necessary for germination. The softening and expanding of the coating permits the seeds to swell and germinate.

While seeds treated according to the above identified application are satisfactory for their intended use, and particularly for precision planting in a mechanical planter, I have found, however, that when such coatings become excessively dry they have an undesirable tendency to crack and to fall away from the seed and that this problem is encountered especially when thick coatings are used. The cracking appears to be caused by a shrinkage or contraction of the coating as it becomes excessively dry. The problem is also encountered with those types of seeds which swell in the presence of moisture which is used when the coating is applied. When such seeds are coated and later dried in the normal manner they shrink back to their original size or thereabouts. Such shrinkage also causes cracking of the coating even when the coating is not excessively dry.

I have found that these difficulties are overcome by applying to the coated seed an outer or finishing coating comprising native sub-bentonite clay, i. e., the native sub-bentonite clay as distinguished from the acid activated clay and a cellulosic material. The principal object and advantage of the invention resides in overcoming these difficulties. The cellulosic material in the finished coating functions solely as a re-enforcing medium for the entire coating and to give it increased mechanical strength. The novel outer coating is still capable of breaking down in the presence of moisture and thus, when the seed is planted, the moisture in the soil is able to cause the entire coating to soften and thereby permit germination.

The outer or finish coating may be applied to any coated seed. It is most useful, however, in connection with seeds that have been coated with a coating which is free of cellulosic material, especially those coatings comprising native sub-bentonite clay either alone or in combination in separate layers or in admixture with such other materials such as sand, alluvial clay, acid-activated sub-bentonite, exfoliated vermiculite, rock dust, fertilizer and the like.

Any sub-bentonite may be used in the finish coating. Sub-bentonites are a class of montmorillonite clays in which the base exchange capacity of the clay is largely satisfied by calcium and magnesium ions. Such clays are usually alkaline earth bentonites and are of a class of bentonites which are activatable by acid treatment to produce activated adsorbents and petroleum and cracking catalysts. These are substantially non-swelling when compared with ordinary swelling bentonites, the base exchange ions of the latter being largely alkaline ions, particularly sodium ions. Typical of sub-bentonites which may be used in practicing my invention are those mined at Cheto, Arizona, those near Lemon and Avery, Mississippi, and near Otay, California. Typical analysis of such non-swelling on a volatile matter free basis (i. e., after heating to 1700° F. without further loss of weight) are as follows: 59.6 to 69 per cent $SiO_2$; 19.5 to 26.0 per cent $Al_2O_3$; 3 to 7 per cent MgO; 1.5 to 3 per cent CaO; and $Na_2O$ in quantities of less than 1.5 per cent. The base exchange capacity of this non-swelling bentonite is from 80 to 130 milliequivalents per 100 grams of volatile free clay.

Any cellulosic material may be used in practicing the invention. In general, a fibrous cellulosic material which has been ground or chopped is desirable such as wood flour, finely ground straw, short fiber cotton or lint and other fibrous material. Shirt fiber cotton or lint may be used as such without grinding or chopping. For best results it is preferred to use wood flour, which is presently available commercially for use as filler material for paper, plaster or plastic wood. Wood flour is made commercially by grinding sawdust and shavings of any kind of wood, especially soft wood such as fir, spruce, pine and the like. It is preferable to use a wood flour or other cellulosic material having a particle size such that all of it will pass through a 30-mesh screen and be retained on a 40-mesh screen, although sizes above and below this range may be used.

The composition of the finish coating may be a mixture having from 50 to 95% by weight of native sub-bentonite clay and from 5 to 50% by weight of cellulosic material. Up to 45% by weight of other materials, such as sand, alluvial clay, exfoliated vermiculite, rock dust, acid activated sub-bentonite, fertilizer and the like, may be added to the mixture, while lowering correspondingly in sufficient amount either or both the amount of cellulosic material and the native sub-bentonite clay. The latter two materials should be present in the above mentioned ranges, however, and not less than 5% by weight of the native sub-bentonite should be used. For best results it is desirable to use in the finished coating 5% of the cellulosic material which is preferably wood flour, and 95% a native sub-bentonite clay.

For most purposes, and particularly for mechanical planting in a precision planter, it is proposed to coat a seed with an amount of coating such that the seed's weight is increased 4 to 500 times or more. The seed is thereby converted into a pellet with entirely different properties from those of the seed alone. In order to prevent cracking of the inner coating or to reduce to a minimum the possibility that an inner coating free of cellulosic material, particularly when the coating comprises native sub-bentonite clay, will not fall away from the seed in the event such coating cracks, it is desirable that the instant finish coating be applied in amounts from about 1 to 10 per cent by weight and preferably 5 per cent by weight of the total weight of the coating applied to the seed. The novel coating itself does not crack when excessively dried or when the seed in the pellet shrinks, and when it is applied to a coated seed in the above amounts it imparts by its re-enforcing action sufficient additional mechanical strength to the entire coating such that the cracking of the coating is prevented, or if cracking does occur the coating will not fall away from the seed. At the same time a seed having the novel finish coating will soften satisfactorily when exposed, after planting, to the moisture in the soil. It is not desirable to increase the strength of the coating to too great an extent since this would interfere with the breakdown of the coating and the germination of the seed after planting. For this reason the cellulosic material should be used in the finish coating only and such coating should not be used in excess of 10% by weight of the total weight of the coating on the seed.

The invention will be further illustrated by the accompanying drawing. The drawing, however, is given for purposes of illustration and the invention in its broader aspects is not limited thereto.

In the drawing the numeral 10 designates an engrossing pan similar to those in common use by candy makers. The engrossing pan is rotatable on the tilted axis 11. A suitable quantity of seed which is designated in the drawing by the reference numeral 12 is placed in the engrossing pan. Appropriate coating material designated in the drawing by reference numeral 13 is slowly added to the engrossing pan through spout 14. The seeds and the coating material are sprayed by a finely atomized water spray 15, formed from water flowing through pipe 16 and compressed air flowing through pipe 17. The engrossing pan 10 is rotated continuously during the addition of the coating material 13 and the water spray 15, and the rotation may be continued after a sufficient quantity of water and coating material has been added. After the desired amount of the inner coating material has been built up upon the seed an appropriate amount of the finish composition is added through the spout 14.

The water spray 15 slightly moistens the seed 12 and the coating material 13. During the rotation of the engrossing pan 10 the seeds become coated with the moist mixture or coating material. The coating material is coated uniformly on the seed and the resulting pellet of substantially uniform size and shape. The thickness of the coating can be controlled by controlling the amount of clay mixture which is applied through spout 14. The quantity of water should be limited to that which is necessary to assure proper coating and may easily be ascertained by observation and inspection.

The seeds are removed from the engrossing pan and are handled with reasonable care while the coating is moist. The coating is dried at a temperature which is below the temperature which would effect sterilization of the seed. The coating is dried sufficiently to prevent the possibility of unintentional germination of the seed, but it should not be dried to the extent of removal of lattice water or water of crystallization from the components of the coating mixture. I have found it desirable to dry the coating to a point where it contains about 5% to 25% by weight of volatile matter and preferably to about 10%.

I claim:

1. A seed pellet consisting of a plant seed embedded in a hard, dry, smooth, coating of a naturally adhesive composition, said coating having an inner layer of finely divided native sub-bentonite clay and an outer layer comprising a mixture of said finely divided native sub-bentonite clay and a natural fibrous cellulosic material, said inner and outer layers being compacted as a unit about the seed by the inherent adhesivity of the finely divided sub-bentonite clay; said pellet having a thickness at least several times greater than the original plant seed and said coating being readily disintegrated upon contact with moisture.

2. A seed pellet consisting of a plant seed embedded in a hard, dry, smooth, coating of a naturally adhesive composition, said coating having an inner layer of finely divided native sub-bentonite clay and an outer layer comprising a mixture of said finely divided native sub-bentonite clay and a natural fibrous cellulosic material, said inner and outer layers being compacted as a unit about the seed by the inherent adhesivity of the finely divided sub-bentonite clay, said outer layer constituting from one to ten per cent by weight of the total coating, said pellet having a thickness at least several times greater than the original plant seed and said coating being readily disintegrated upon contact with moisture.

3. A seed pellet consisting of a plant seed embedded in a hard, dry, smooth, coating of a naturally adhesive composition, said coating having an inner layer comprising finely divided native sub-bentonite clay and an outer layer comprising a mixture of at least 50 per cent by weight of said finely divided native sub-bentonite clay and from 5 per cent to 50 per cent of natural fibrous cellulosic material, said inner and outer layers being compacted as a unit about the seed by the inherent adhesivity of the said finely divided native sub-bentonite clay, said pellet having a thickness at least several times greater than the original plant seed and said coating being readily disintegrated upon contact with moisture.

4. A seed pellet consisting of a plant seed embedded in a hard, dry, smooth, coating of a naturally adhesive composition, said coating having an inner layer comprising finely divided native sub-bentonite clay and an outer layer comprising a mixture of at least 50 per cent by weight of said finely divided native sub-bentonite clay and from 5 per cent to 50 per cent of natural fibrous cellulosic material, said inner and outer layers being compacted as a unit about the seed by the inherent adhesivity of the said finely divided native sub-bentonite clay, said outer layer constituting from one to ten per cent by weight of the total coating, said pellet having a thickness at least several times greater than the original plant seed and said coating being readily disintegrated upon contact with moisture.

5. A seed pellet of the type set forth in claim 1, in which said natural fibrous cellulosic material is wood flour.

6. A seed pellet of the type set forth in claim 4 in which said natural fibrous cellulosic material is wood flour.

7. A seed pellet of the type set forth in claim 1, in which said natural fibrous cellulosic material is short fibre cotton.

8. A seed pellet of the type set forth in claim 4, in which said natural fibrous cellulosic material is short fibre cotton.

9. A seed pellet of the type set forth in claim 1, in which said natural fibrous cellulosic material is ground straw.

10. A seed pellet of the type set forth in claim 4, in which said natural fibrous cellulosic material is ground straw.

FREDERICK W. BURGESSER.

REFERENCES CITED

The following references are of record in the file of this patent:

UNITED STATES PATENTS

| Number | Name | Date |
|---|---|---|
| 1,819,953 | Funk | Aug. 18, 1931 |
| 2,502,809 | Vogelsang | Apr. 4, 1950 |